United States Patent [19]

Nyilas et al.

[11] Patent Number: 4,848,774

[45] Date of Patent: Jul. 18, 1989

[54] REACTOR COOLANT PUMP HYDROSTATIC SEALING ASSEMBLY WITH EXTERNALLY PRESSURIZED HYDRAULIC BALANCE CHAMBER

[75] Inventors: Charles P. Nyilas, Monroeville; Richard F. Guardiani, Ohio Twp., Allegheny County, both of Pa.

[73] Assignee: Westinghouse Electric Corp., Pittsburgh, Pa.

[21] Appl. No.: 91,224

[22] Filed: Aug. 31, 1987

[51] Int. Cl.$^4$ .................. F16J 15/34; F01D 11/02; F04D 29/12

[52] U.S. Cl. .......................... 277/3; 277/27; 277/28; 277/81 R; 415/111; 415/113

[58] Field of Search .................. 277/27, 29, 81 R, 28, 277/74, 3, 15; 415/111, 112, 113

[56] References Cited

U.S. PATENT DOCUMENTS

| | | | |
|---|---|---|---|
| 3,033,577 | 5/1962 | Spiess | 277/3 |
| 3,034,797 | 5/1962 | Pikt | 277/74 X |
| 3,334,905 | 8/1967 | Horwitz et al. | 277/27 X |
| 3,447,809 | 6/1969 | Markuto et al. | 277/27 |
| 3,511,510 | 5/1970 | Lindarboom | 277/27 |
| 3,522,948 | 8/1970 | Mac Crum | 277/27 |
| 3,529,838 | 9/1970 | Singleton | 277/27 |
| 3,632,117 | 1/1972 | Villasor | 277/3 |
| 3,720,222 | 3/1973 | Andrews et al. | 137/154 |
| 3,949,996 | 4/1976 | Inoue et al. | 277/27 X |
| 4,183,540 | 1/1980 | Hytonen | 277/27 |
| 4,212,475 | 7/1980 | Sedy | 277/27 X |
| 4,275,891 | 6/1981 | Does | 277/96.1 |
| 4,415,165 | 11/1983 | Martini | 277/27 |
| 4,427,620 | 1/1984 | Cook | 376/216 |
| 4,434,132 | 2/1984 | Cook | 376/259 |
| 4,511,149 | 4/1985 | Wiest | 277/27 X |

Primary Examiner—Allan N. Shoap

[57] ABSTRACT

A pump having a shaft and housing containing pressurized system fluid variable between low pressure at pump startup and high pressure at pump operation, employs a hydrostatic sealing assembly for sealably and rotatably mounting the shaft within the housing. In the assembly, both a runner mounted around the shaft for rotation therewith and a seal ring mounted to the housing have facing surfaces between which pressurized system fluid creates a flowing low pressure fluid film which prevents contact between the facing surfaces so long as a predetermined minimum leakrate is maintained therebetween. First and third seal ring surfaces face in opposite directions with the second surface facing in the same direction as faced by the seal ring facing surface. First and second chambers are defined contiguous to the first and second surfaces with the first chamber in communication with pressurized system fluid and isolated from the second chamber and with the latter isolated from the runner and seal ring facing surfaces. Pressurized balance fluid provided to the second chamber via a passage through the housing from the exterior thereof is at a balance pressure greater than the supply pressure of the system fluid such that the balance pressure is effective at pump startup when the supply pressure is low, and ineffective at pump operation when the supply pressure is high, to counter a seating force imposed on the seal ring first surface by the supply pressure and augment a lifting force imposed on the seal ring facing surface by the supply pressure so that at both pump startup and operation leakrates are produced between the runner and seal ring facing surfaces which are above the predetermined minimum.

30 Claims, 9 Drawing Sheets

REACTOR COOLANT PUMP HYDROSTATIC SEALING ASSEMBLY WITH EXTERNALLY PRESSURIZED HYDRAULIC BALANCE CHAMBER

CROSS REFERENCE TO RELATED APPLICATIONS

Reference is hereby made to the following copending applications dealing with related subject matter and assigned to the assignee of the present invention:

1. "Sealing Device For The Drive Shaft Of A High Pressure Fluid Pump" by N. Bonhomme, assigned U.S. Ser. No. 379,196 and filed May 17, 1982, now U.S. Pat. No. 4,587,076, issued May 6, 1986.

2. "Nuclear Reactor Coolant Pump Impeller/Shaft Assembly" by L. S. Jenkins, assigned U.S. Ser. No. 761,447 and filed Aug. 1, 1985, now U.S. Pat. No. 4,690,612, issued Sept. 1, 1987.

3. "Improved Shaft Seal" by K. P. Quinn, assigned U.S. Ser. No. 739,745 and filed May 31, 1985, now U.S. Pat. No. 4,693,481, issued Sept. 15, 1987.

4. "Reactor Coolant Pump Hydrostatic Sealing Assembly With Improved Hydraulic Balance" by R. F. Guardiani et al, assigned U.S. Ser. No. 063,331 and filed June 17, 1987.

5. "Reactor Coolant Pump Sealing Surface With Titanium Nitride Coating" by G. Zottola, assigned U.S. Ser. No. 035,832 and filed Apr. 8, 1987, now abandoned.

BACKGROUND OF THE INVENTION

1. Field of the Invention

The present invention relates generally to shaft seals and, more particularly, is concerned with a hydrostatic sealing assembly with an externally pressurized hydraulic balance chamber for sealing a shaft of a reactor coolant pump used in a nuclear power plant.

2. Description of the Prior Art

In pressurized water nuclear power plants, a reactor coolant system is used to transport heat from the reactor core to steam generators for the production of steam. The steam is then used to drive a turbine generator. The reactor coolant system includes a plurality of separate cooling loops, each connected to the reactor core and containing a steam generator and a reactor coolant pump.

The reactor coolant pump typically is a vertical, single stage, centrifugal pump designed to move large volumes of reactor coolant at high temperatures and pressures, for example 550 degrees F. and 2500 psi. The pump basically includes three general sections from bottom to top—hydraulic, shaft seal and motor sections. The lower hydraulic section includes an impeller mounted on the lower end of a pump shaft which is operable within the pump casing to pump reactor coolant about the respective loop. The upper motor section includes a motor which is coupled to drive the pump shaft. The middle shaft seal section includes three tandem sealing assemblies—lower primary, middle secondary and upper tertiary sealing assemblies. The sealing assemblies are located concentric to, and near the top end of, the pump shaft and their combined purpose is to provide for zero reactor coolant leakage along the pump shaft to the containment atmosphere during normal operating condition. Representative examples of pump shaft sealing assemblies known in the prior art are the ones disclosed in U.S. Patents to MacCrum (3,522,948), Singleton (3,529,838), Villasor (3,632,117), Andrews et al (3,720,222) and Boes (4,275,891) and in the first three patent applications cross-referenced above, all of which are assigned to the same assignee as the present invention.

The lower primary sealing assembly is the main seal of the pump. It is typically a hydrostatic, radially tapered "film-riding", controlled leakage seal whose primary components are an annular runner which rotates with the pump shaft and a non-rotating seal ring which is attached to the housing of the lower sealing assembly. Representative examples of such hydrostatic seals are the one disclosed hereinafter in the introductory portion of the detailed description section of the subject application, and the ones disclosed in the third cross-referenced application and in the MacCrum, Singleton, Villasor and Andrews et al patents.

Historically, the pump shaft seals constitute the main problem area for the reactor coolant pumps and significantly contribute to the utilization factor in nuclear power plants. The seals must be capable of breaking down the high system pressure (about 2500 psi) safely. Whereas the tandem arrangement of three seals is used to break down the pressure, the lower main seal absorbs most of the pressure drop (approximately 2250 psi). Being a hydrostatic "film-riding" seal, the lower seal is designed to "lift off" (separate) at low system pressures without pump rotation. The lifting force is produced by a hydrostatic pressure force present in the gap between the stationary seal ring and the rotating runner. A closing or seating force, which must balance the lifting force, is produced by the system pressure acting on the surfaces opposite the film surfaces of the seal ring and runner.

One of the potential problems associated with the lower seal stems from the preference to use a very pure grade of aluminum oxide as the faceplate material for the seal ring and runner. Use of such material is advantageous since it is harder than crud particles (usually iron oxide) which are small enough to enter the gap between the faces of the seal ring and runner, but large enough to lodge part way through the gap. However, a major disadvantage of aluminum oxide is that it is basically incompatible in rubbing against itself. If the seal faces monentarily contact while in motion, then usually some damage can be expected. If the rub is heavy enough, the faces are very seriously damaged and in some cases the thermal shock can lead to cracking and breakup of the structure.

For this reason, seal operating limitations and requirements are set very strictly. A minimum differential pressure (200 psi) must be maintained to establish a stable film between the faces and prevent rubbing when starting the pump. A minimum leakrate (0.2 gpm) is required for cooling and, most importantly, as a means of determining that an adequate film thickness exists prior to starting. Clearly the seal is most vulnerable at plant startup since the available differential pressure is low and crud may be present. Once the film is established, however, there is practically no seal face wear and the seal has a very long life expectancy.

Consequently, as long as a film riding seal continues to be preferred and faceplate materials such as aluminum oxide are employed, a need will remain for an effective way to prevent rubbing together of the faces of the seal ring and runner of the lower hydrostatic primary sealing assembly.

SUMMARY OF THE INVENTION

The primary invention provides a reactor coolant pump primary sealing assembly designed to satisfy the aforementioned needs. The sealing assembly of the present invention relates to a hydrostatic seal with an externally pressurized balance chamber. The chamber is connected to an external pressure source which regulates the seating force of a seal ring by either increasing or reducing the axial hydrostatic load on the seal ring. This feature will extend the hydrostatic operating range of the sealing assembly to very low pressures by reducing the seating force sufficiently to balance the hydraulic lift forces developed in the hydrostatic facing surfaces on the runner and seal ring of the sealing assembly. This is particularly useful in reactor coolant pump shaft seal systems which require relatively high leakrates at low (pump startup) supply pressures and low leakrates at high (pump operating) supply pressures.

Accordingly, the present invention is directed to the combination of a pump including a shaft and a housing having an exterior and an interior for containing pressurized system fluid, an external system fluid source for providing pressurized system fluid to the housing interior at a supply pressure which is variable between a low pressure at pump startup and a high pressure at pump operation, and a hydrostatic sealing assembly for sealably and rotatably mounting the shaft within the housing interior. The sealing assembly comprises: (a) an annular runner circumscribing and mounted around the shaft for rotation therewith; (b) an annular seal ring circumscribing and mounted within the housing interior in non-rotational relationship thereto but for translatory movement along the shaft; (c) the runner and seal ring having surfaces facing one another and between which pressurized system fluid within the housing interior creates a flowing film of low pressure fluid which prevents the facing surfaces of the respective runner and seal ring from coming into contact with one another so long as a predetermined minimum leakrate is maintained therebetween; (d) means defining first and second surfaces on the seal ring facing in directions opposite to one another and in sealingly isolated relationship from one another, the first surface on the seal ring being in flow communication with pressurized system fluid at the supply pressure thereof within the housing interior and facing in a direction opposite to that faced by the facing surface on the seal ring, the second surface on the seal ring being in sealingly isolated relationship with respect to the facing surfaces on the runner and seal ring and facing in a direction the same as that faced by the facing surface on the seal ring; (e) an external balance fluid source for providing pressurized balance fluid to the second surface on the seal ring at a balance pressure which alignments the supply pressure of the pressurized system fluid by a constant differential pressure such that is effective at pump startup when the supply pressure is low, and ineffective at pump operation when the supply pressure is high, to counter a seating force imposed on the seal ring first surface by the supply pressure and augment a lifting force imposed on the seal ring facing surface by the supply pressure so that at both pump startup and operation leakrates are produced between the facing surfaces of the runner and seal ring which are above the predetermined minimum thereof; and (f) means for providing flow communication of pressurized balance fluid from the external balance fluid source to the second surface of the seal ring.

More particularly, the first surface of the seal ring defines a substantially larger area than the second surface thereof. Also, means defining the first and second surfaces on the seal ring includes first and second spaced apart annular seal means disposed along the seal ring between the seal ring and the shaft, and defining first and second chambers disposed contiguous with the first and second isolated surfaces on the seal ring. The balance fluid flow communication providing means is a flow passage defined within the housing from the exterior thereof to the second chamber disposed contiguous with the second surface of the seal ring. Thus, the first annular seal means sealingly isolates the first chamber from the second chamber and in communication with the pressurized system fluid at the supply pressure, whereas the second annular seal means sealingly isolates the second chamber from the facing surfaces of the runner and the seal ring.

Still further, the external system fluid source includes a pressurized fluid pumping source and a main fluid flow line connecting the pumping source to the housing interior to communicate pressurized system fluid thereto. The external balance fluid source includes a bypass fluid flow means connecting the main fluid flow line to the balance fluid flow passage and a differential pressure regulating valve disposed in the bypass fluid flow means for receiving pressurized system fluid and producing the pressurized balance fluid.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

BRIEF DESCRIPTION OF THE INVENTION

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Reactor Coolant Pump

Figure 1:
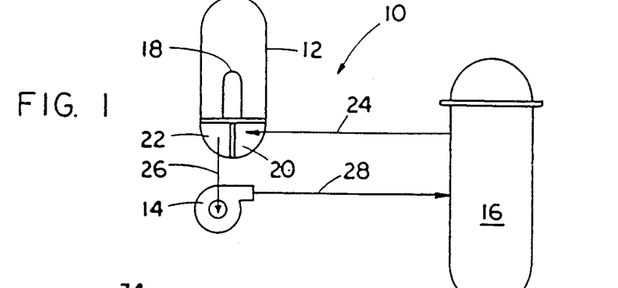
FIG. 1 is a schematic representation of one cooling loop of a conventional nuclear reactor coolant system which includes a steam generator and a reactor coolant pump connected in series in a closed coolant flow circuit with the reactor core.

Referring now to the drawings, and particularly to FIG. 1, there is shown a schematic representation of one of a plurality of cooling loops 10 of a conventional nuclear reactor coolant system. The cooling loop 10 includes a steam generator 12 and a reactor coolant pump 14 serially connected in a closed coolant flow circuit with a nuclear reactor core 16. The steam generator 12 includes primary tubes 18 communicating with inlet and outlet plenums 20,22 of the generator. The inlet plenum 20 of the steam generator 12 is connected in flow communication with the outlet of the reactor core 16 for receiving hot coolant therefrom along flow path 24 of the closed flow circuit. The outlet plenum 22 of the steam generator 12 is connected in flow communication with an inlet suction side of the reactor coolant pump 14 along flow path 26 of the closed flow circuit. The outlet pressure side of the reactor coolant pump 14 is connected in flow communication with the inlet of the reactor core 16 for feeding cold coolant thereto along flow path 28 of the closed flow circuit.

In brief, the coolant pump 14 pumps the coolant under high pressure about the closed flow circuit. Particularly, hot coolant emanating from the reactor core 16 is conducted to the inlet plenum 20 of the steam generator 12 and to the primary tubes 18 in communication therewith. While in the primary tubes 18, the hot coolant flows in heat exchange relationship with cool feedwater supplied to the steam generator 12 via conventional means (not shown). The feedwater is heated and portions thereof changed to steam for use in driving a turbine generator (not shown). The coolant, whose temperature has been reduced by the heat exchange, is then recirculated to the reactor core 16 via the coolant pump 14.

The reactor coolant pump 14 must be capable of moving large volumes of reactor coolant at high temperatures and pressures about the closed flow circuit. Although the temperature of the coolant flowing from the steam generator 12 to the pump 14 after heat exchange has been cooled substantially below the temperature of the coolant flowing to the steam generator 12 from the reactor core 16 before heat exchange, its temperature is still relatively high, being typically about 550 degrees F. The coolant pressure sealed by the pump is typically about 2250 psi.

Figure 2:
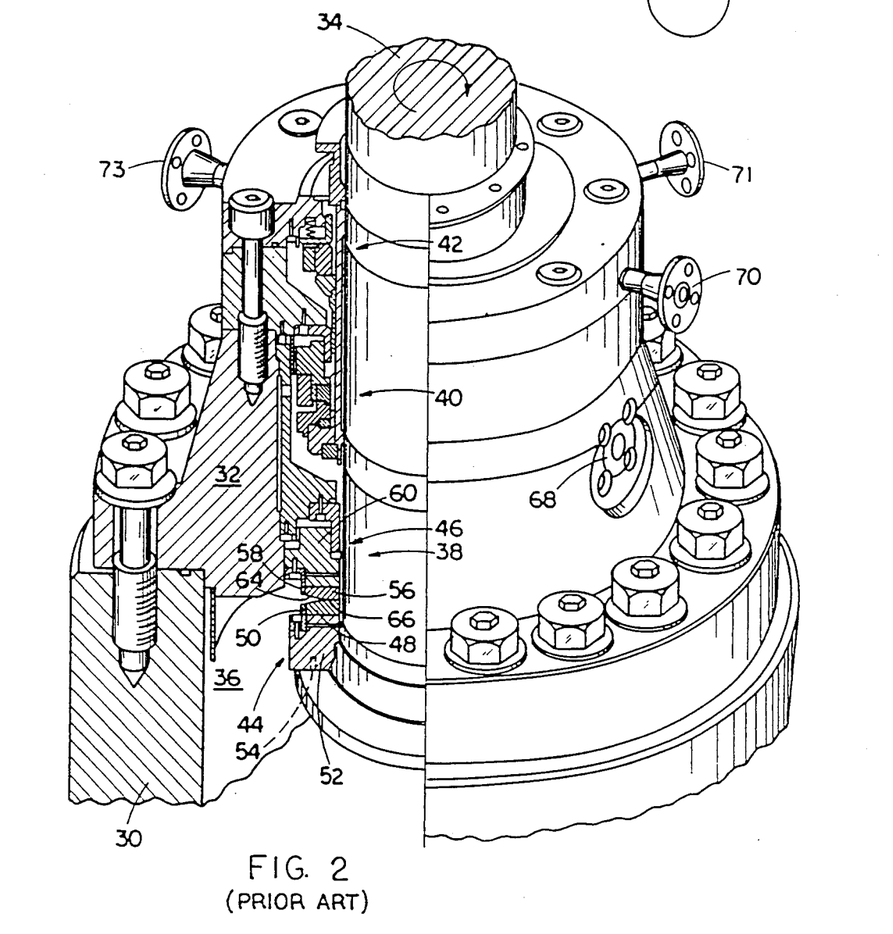
FIG. 2 is a cutaway perspective view of the shaft seal section of the prior art reactor seal housing, illustrating in cross-section the seal housing and the lower primary, middle secondary and upper tertiary sealing assemblies which are disposed within the bearing assembly and surround the pump shaft in this section of the pump.
Figure 3:
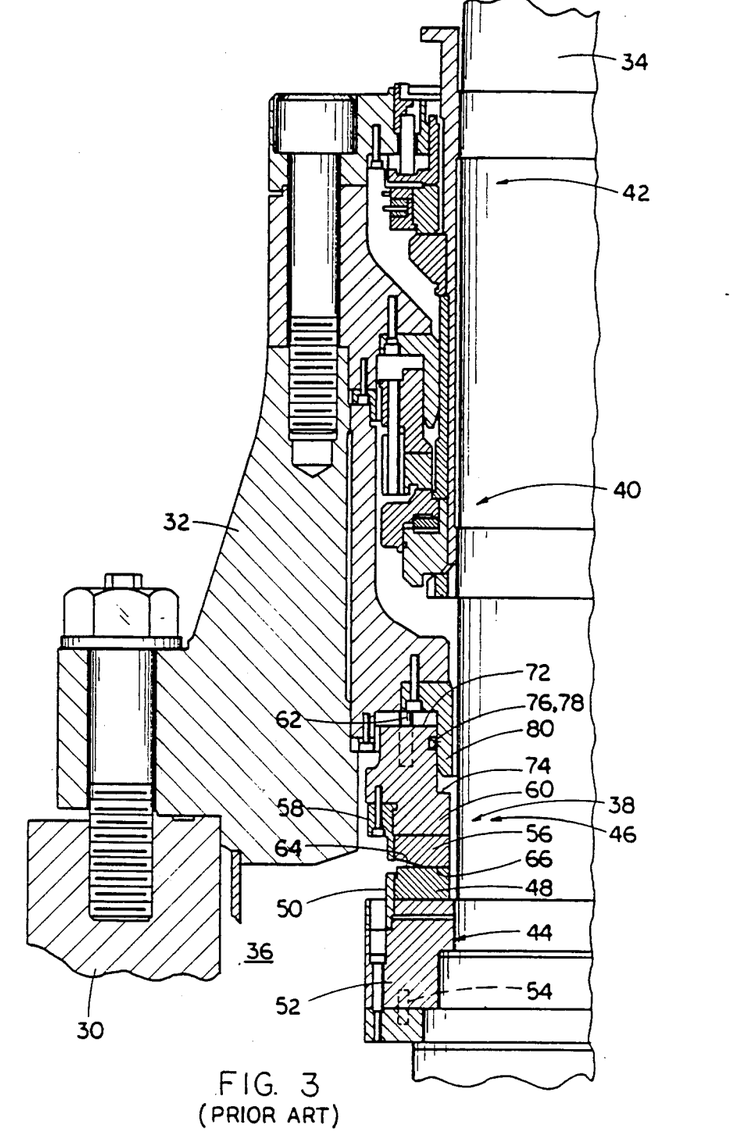
FIG. 3 is an enlarged view of the cross-sectioned seal housing and sealing assemblies of the prior art reactor coolant pump of FIG. 2.

As seen in FIGS. 2 and 3, the prior art reacor coolant pump 14 generally includes a pump housing 30 which terminates at one end in a seal housing 32. The pump 14 also includes a pump shaft 34 extending centrally of the housing 30 and being sealingly and rotatably mounted within the seal housing 32. Although not shown, the bottom portion of the pump shaft 34 is connected to an impeller, while a top portion thereof is connected to a high-horsepower, induction-type electric motor. When the motor rotates the shaft 34, the impeller within the interior 36 of the housing 30 circulates the coolant flowing through the pump housing 30 at pressures from ambient to approximately 2500 psi cover gas. This pressurized coolant applies an upwardly directed, hydrostatic load upon the shaft 34 since the outer portion of the seal housing 32 is surrounded by the ambient atmosphere.

In order that the pump shaft 34 might rotate freely within the seal housing 32 while maintaining the 2500 psi pressure boundary between the housing interior 36 and the outside of the seal housing 32, tandemly-arranged lower primary, middle secondary and upper tertiary sealing assemblies 38,40,42 are provided in the positions illustrated in FIGS. 2 and 3 about the pump shaft 34 and within the pump housing 30. The lower primary sealing assembly 38 which performs most of the pressure sealing (approximately 2250 psi) is of the non-contacting hydrostatic type, whereas the middle secondary and upper tertiary sealing assemblies 40,42 are of the contacting, mechanical type.

Figure 4:
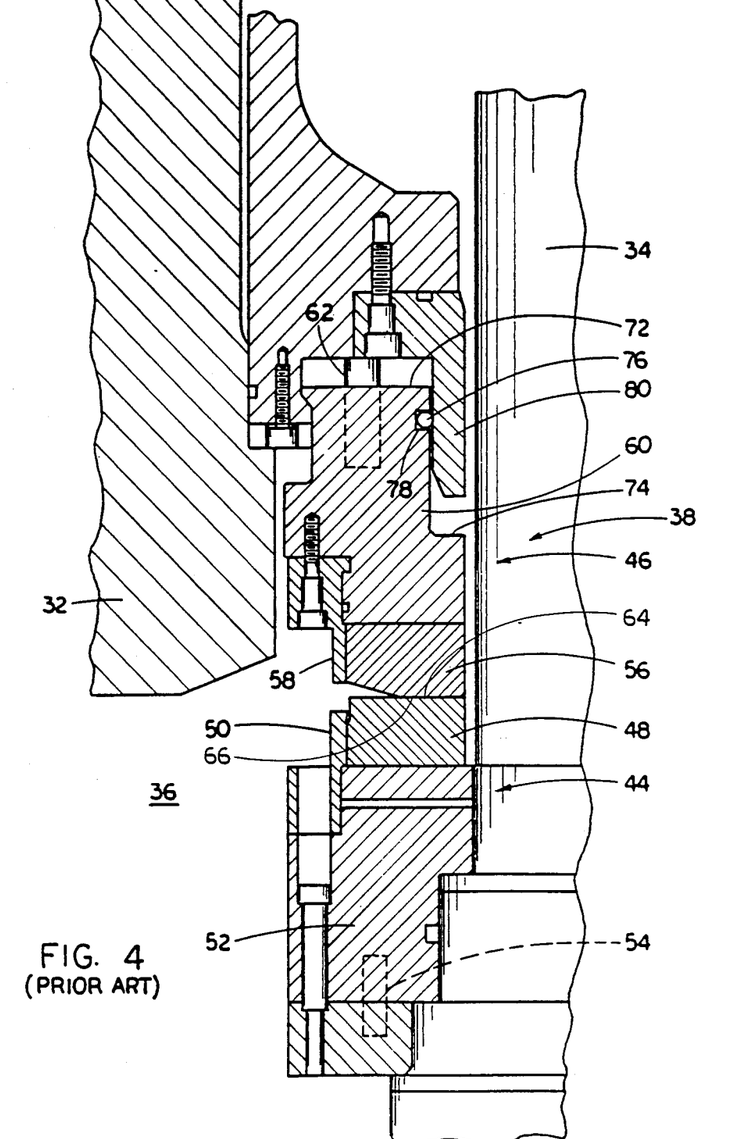
FIG. 4 is an enlarged cross-sectional view of the lower primary sealing assembly and a portion of the bearing assembly of the prior art reactor coolant pump as seen in FIG. 3.

As more clearly seen in FIG. 4, the lower hydrostatic primary sealing assembly 38 of the prior art pump 14 generally includes an annular runner 44 which is mounted to the pump shaft 34 for rotation therewith and an annular seal ring 46 which is stationarily mounted within the seal housing 32. The runner 44 includes an annular runner faceplate 48 mounted by a hydrostatic clamp ring 50 to an annular runner support member 52 which, in turn, is keyed to the pump shaft 34 by anti-rotation pins 54. The seal ring 46 includes an annular ring faceplate 56 mounted by a hydrostatic clamp ring 58 to an annular ring support member 60 which, in turn, is keyed to the seal housing 32 by anti-rotation pin 62 so as to prevent rotational movement of the seal ring 46 relative to the seal housing 32 but allow translatory movement of the seal ring 46 along pump shaft 34 toward and away from the runner 44.

Facing (or top and bottom) surfaces 64,66 of the respective runner and ring faceplates 48,56 are biased toward one another as a result of the coolant pressure load on the pump shaft 34. However, the surfaces 64,66 normally do not frictionally engage one another, since the surface 66 of the seal ring faceplate 56 is tapered at a shallow angle with respect to the substantially flat and horizontal surface 64 on the runner faceplate 48. Such tapering provides a flowing film of coolant fluid between the surfaces 64,66 which, in turn, allows the runner 44 and seal ring 56 to rotate relative to one another in a "film-riding" mode.

Because the primary sealing assembly 38 normally operates in a film-riding mode, some provision must be made for handling coolant fluid which "leaks off" in the annular space between the seal housing 32 and the shaft 34 rotatably mounted thereto and enters through injection supply port 73 as seen in FIG. 2. Accordingly, the seal housing 32 includes a primary leakoff port 68, whereas leakoff port 70 accommodates coolant fluid leakoff from the secondary sealing assembly 40 and leakoff port 71 accommodates coolant fluid leakoff from the tertiary sealing asssembly 42.

Figure 8:
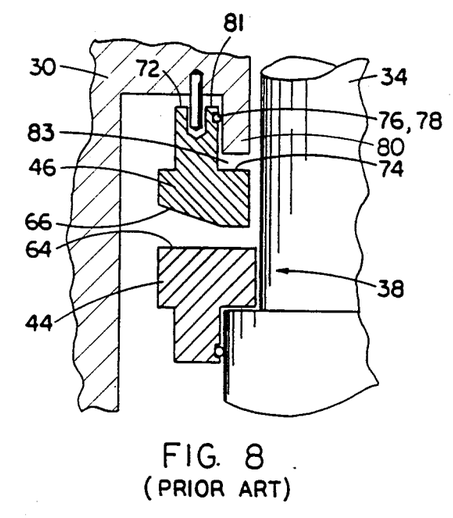
FIG. 8 is a simplified schematic representation of the lower primary sealing assembly of the prior art reactor coolant pump of FIG. 4, illustrating the tapered convergent flow path between the seal ring and runner of the primary sealing assembly.
Figure 9:
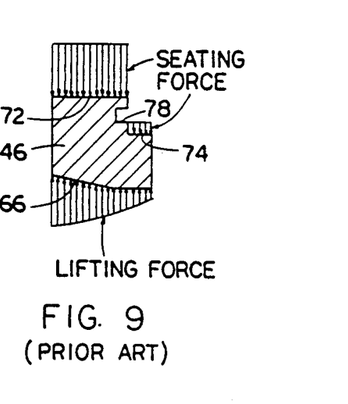
FIG. 9 is a schematic representation of the seal ring of the prior art primary sealing assembly of FIG. 8, illustrating the areas thereon at which are applied opposing lifting and seating forces.

As schematically depicted in FIG. 8, the facing surfaces 64,66 of the respective runner 44 and seal ring 46 of the primary sealing assembly 38 are designed to "liftoff" or separate at low system pressure without pump shaft rotation. The lifting force is produced by the hydrostatic pressure force between the runner 44 and seal ring 46. As seen in FIG. 9, an opposing seating force, which must balance the lifting force, is produced by the system pressure acting on a pair of adjacent outer and inner peripheral upwardly-facing surfaces 72,74 of the seal ring 46 located on an opposite side thereof from its downwardly-facing surface 66. The lifting force, graphically depicted in FIG. 10, varies inversely with film thickness between the facing surfaces 64,66 of the runner 44 and seal ring 46. So where the ring 46 is tapered with a convergent flow path, the lifting force will decrease as the film thickness increases.

Figure 10:
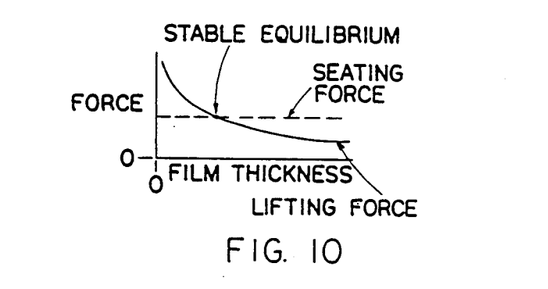
FIG. 10 is a graph demonstrating the relationships between film thickness, lifting force and seating force produced by the prior art primary sealing assembly of FIG. 8.

This should result in a stable equilibrium condition seen in FIG. 10 because (1) there is only one film thickness value which will produce a lifting force exactly equal and opposite to the hydrostatic seating force which exists on the opposite side of the seal ring 46 and (2) small changes in seating force will always produce a comparable change in film thickness and lifting force. In the design of FIG. 8, hydrostatic loading at the balance diameter of the seal ring 46 is ensured by an O-ring 76 seated within an annular groove 78 which circumscribes the inner diameter of an upper portion of the seal ring 46. The O-ring 76 allows the seal ring 46 to vertically ride on a cylindrical wear sleeve 80 which forms part of the seal housing 32 of the coolant pump 14 in order for the seal ring to adjust to pump shaft motion and pressure changes, The seal provided by the O-ring 76 not only prevents leakage, but also serves to determine the magnitude of the seating force. The O-ring 76 defines an upper chamber 81 which communicates with system pressure fluid and a lower chamber 83 which communicates with low pressure fluid emanating from the flow of fluid film into the gap between the facing surfaces 64,66. The inner diameter of the upper portion of seal ring 46 determines the position of transition from high system pressure to low back pressure and thus determines the magnitude of the pressure component of the seating force in FIG. 10. The seating force is quite sizable. At full system pressure, it is nearly equal to 100,000 lbs.

As mentioned previously, to prevent corrosion, erosion and wear, the material of the faceplates 48,56 in FIG. 4 is preferably aluminum oxide. However, since this material can be damaged if rubbed against itself, a minimum differential pressure (approximately 200 psi) must be maintained to establish a stable film and prevent rubbing when starting the pump 14. Clearly, the seal provided between the faceplates is most vulnerable at startup since the available differential pressure is low and the sealing film must be established to prevent rubbing of the facing surfaces 64,66.

At startup, the resulting leakage is in order of magnitude less than at full pressure. The required minimum leakage to startup (0.2 gpm) can, in fact, be too small to accurately measure with the instruments that are presently used in reactor power plants. Because low leakage can be an indication of possible crud blockage at the facing surfaces 64,66 or failure of the surfaces to separate, operators are reluctant to start the pump to avoid damaging the facing surfaces of the primary sealing assembly 38. In a high percentage of cases, the low leakrates are simply due to unreliable instrumentation. To correct the problem or confirm the lack of a problem, operators conduct a number of involved system checks. The effort is a time consuming and a continuing nuisance in an operation where the pumps represent a small part of the startup logistics.

Figure 11:
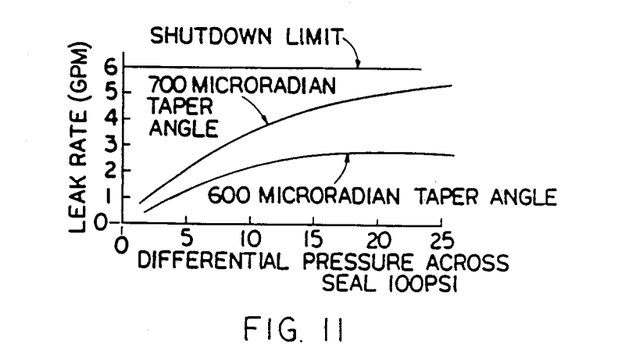
FIG. 11 is a graph demonstrating the effect on leakage rate across the entire pressure range of the prior art primary sealing assembly of increasing the convergence angle of the faceplate on the seal ring from a 600 to a 700 microradian taper angle.

To compensate for the low leakage problem, seal designers can open up the seal faceplate convergence angle (taper). However, as can be understood from the graph of FIG. 11, this would result in high leakrates across the entire pressure range. The primary disadvantage with this technique is at high system pressure where the resulting leakrates approach and may exceed shutdown limits. The increased convergence angle (taper) is, in fact, opposite to what seal designers would prefer to introduce were it not for the low pressure leakage requirement. A reduction in the convergence angle (taper) would reduce the high pressure leakrates and provide significantly more margin to shutdown limits, but this would introduce leakrates below the minimum acceptable at low system pressures (i.e., 0,2 gpm at 200 psig).

Modified Reactor Coolant Pump of the Present Invention

Ideally, the solution to the problem is a seal which maintains a constant leakage over the pressure range. To accomplish this, either the convergence angle (taper) or seating force would have to change in a controlled manner over the entire system pressure range. Varying either one of these parameters in a controlled fashion becomes a very difficult and complex challenge.

A more practical and relatively simple alternative is proposed by the present invention.

Turning now to FIGS. 5-7 and 12, there is shown the modified primary sealing assembly of the present invention, being generally designated by the numeral 82. Only the parts of the modified primary sealing assembly 82 which are different from the prior art primary sealing assembly 38 (best seen in FIG. 4), and thus relate to the modifications underlying the present invention, will be described in detail hereafter and be identified by different reference numerals.

Figure 6:
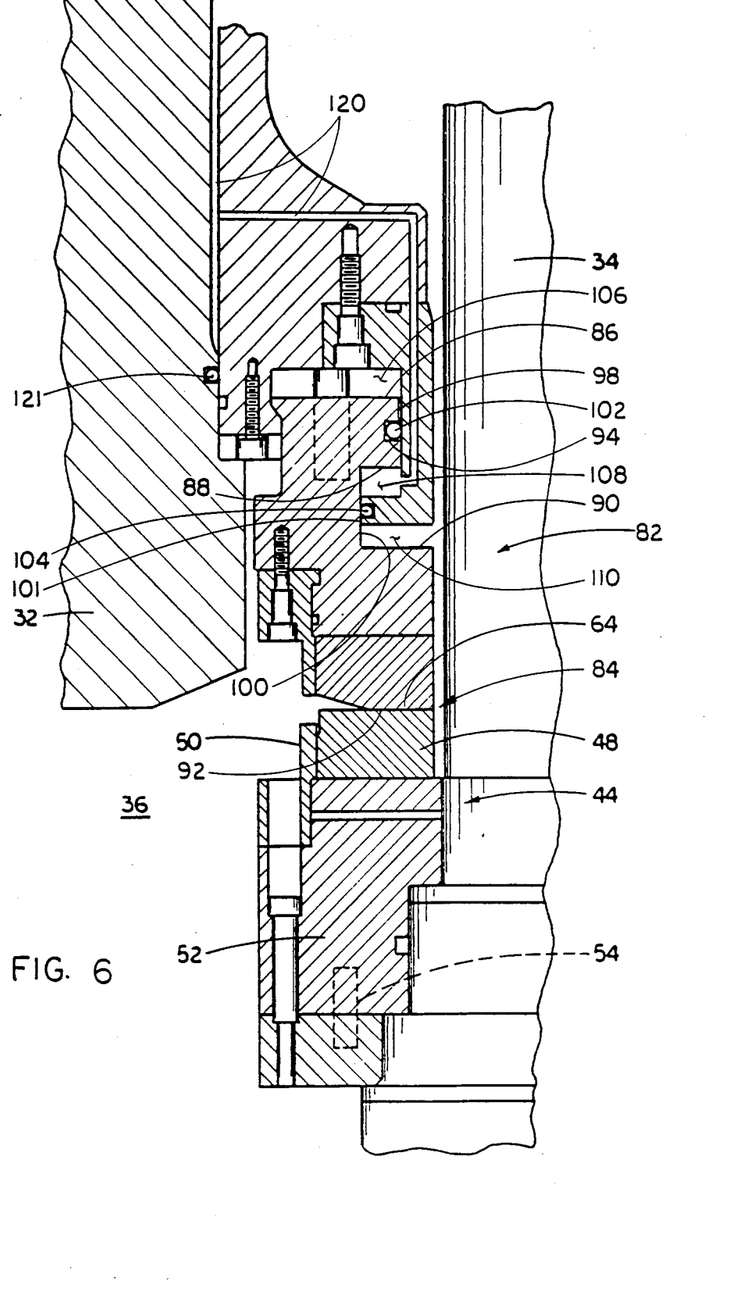
FIG. 6 is a view similar to that of FIG. 4, but illustrating the lower primary sealing assembly of the reactor coolant pump after modification in accordance with the principles of the present invention to incorporate therein the externally pressurized balance chamber.
Figure 12:
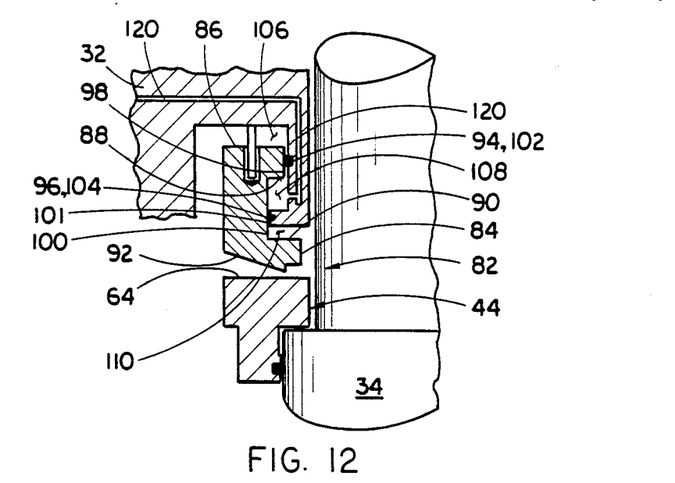
FIG. 12 is a simplified schematic representation of the lower primary sealing assembly of the reactor coolant pump of FIG. 6 modified in accordance with the principles of the present invention.

The modified primary sealing assembly 82 includes a modified seal ring 84 having first, second and third annular peripheral upper surfaces 86,88,90. The first and third peripheral surfaces 86,90 face in a direction opposite to that faced by the second peripheral surface 88 and the same as that faced by the bottom surface 92 of the seal ring 84 which faces the adjacent top surface 64 of the faceplate 48 of the runner 44. The respective peripheral upper surfaces 86,88,90 are sealingly isolated from one another by first and second annular seal means in the form of a pair of grooves 94,96 and a pair of O-rings 102,104 disposed in the respective pair of grooves 94,96. Vertical surfaces 98,100 located at the inside diameter of the seal ring 84 extend transversely between and interconnect the respective peripheral surfaces 86,88,90, as seen in FIGS. 6 and 12. The groove 94 is defined in the upper inner vertical surface 98 on the seal ring 84, whereas the groove 96is defined in the lower vertical surface 101 of the seal housing 32.

Thus, the one upper groove 94 and associated O-ring 102 which comprise the first or upper annular seal means are disposed along the seal ring 84 between it and the shaft 34 and between the first and second peripheral upper surfaces 86,88 thereon. In such manner, a first or upper balance chamber 106 is defined contiguous with the first peripheral surface 86 which communicates with the pressurized system fluid in the housing 30 at the supply pressure thereof. On the other hand, the other lower groove 96 and associated O-ring 104 which comprise the second or lower annular seal means are likewise disposed along the seal ring 84 between it and the shaft 34, but between the second and third peripheral upper surfaces 88,90 thereon. Now, a second or middle balance chamber 108 is defined contiguous with the second peripheral surface 88, and a third or lower balance chamber 110 is defined contiguous with the third peripheral surface 90 which communicates with the fluid film that flows between the facing surfaces 64,92 of the runner 44 and seal ring 84 at the low pressure thereof. Thus, the first, second and third balance chambers 106,108,110 are defined by the first and second annular seal means in substantially noncommunicative isolated relationship to one another. It will be observed that the first balance surface 86 covers a substantially larger area than either the second or third surfaces 88,90. In view of the larger area of the first surface 86 compared to the third surface 90, it can be understood that a large proportion of the seating force will be produced at the first surface 86 in response to the supply pressure of the pressurized system fluid in the housing 30.

Figure 5:
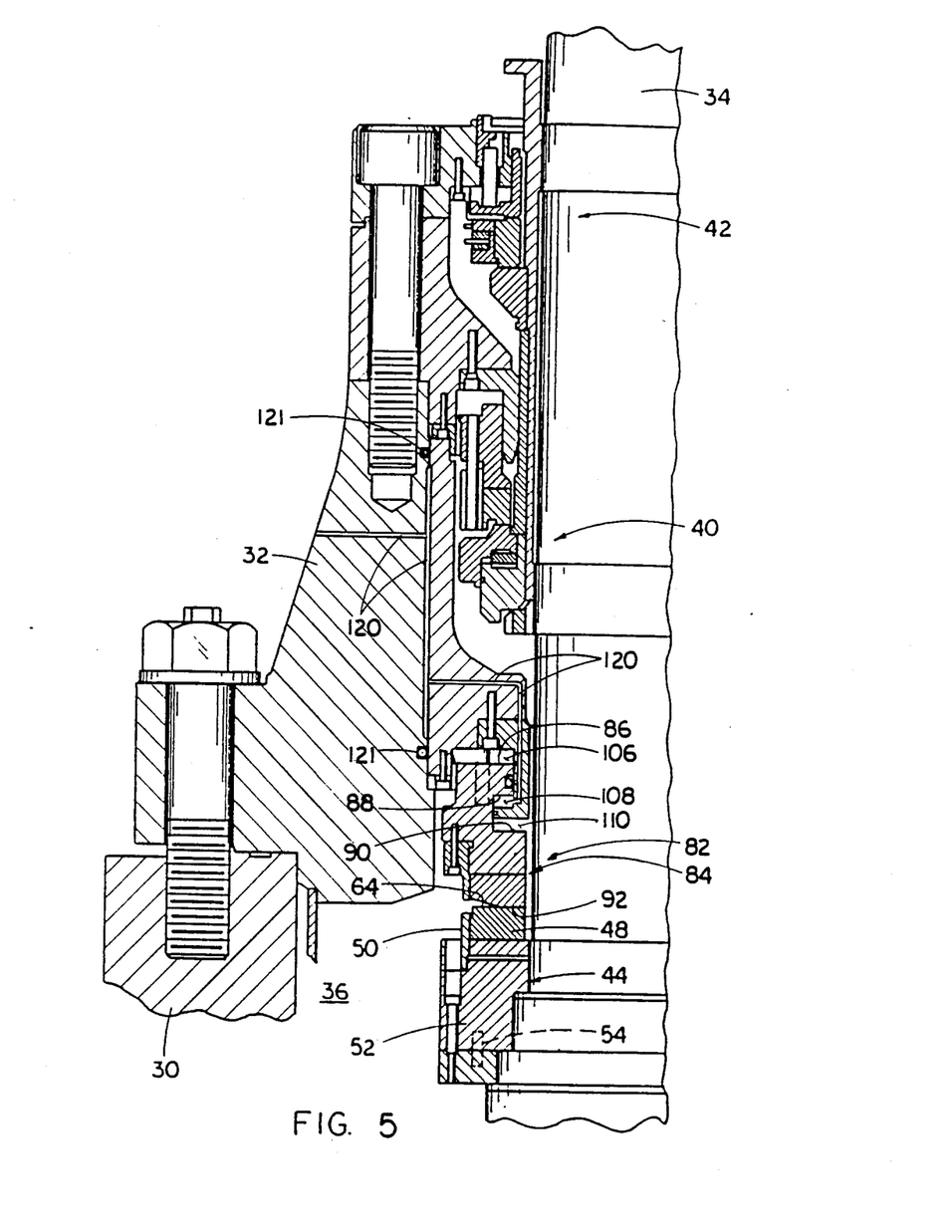
FIG. 5 is a view similar to that of FIG. 3, but illustrating the seal housing and lower primary sealing assembly of a reactor coolant pump after modification in accordance with the principles of the present invention to incorporate an externally pressurized hydraulic balance chamber therein.
Figure 7:
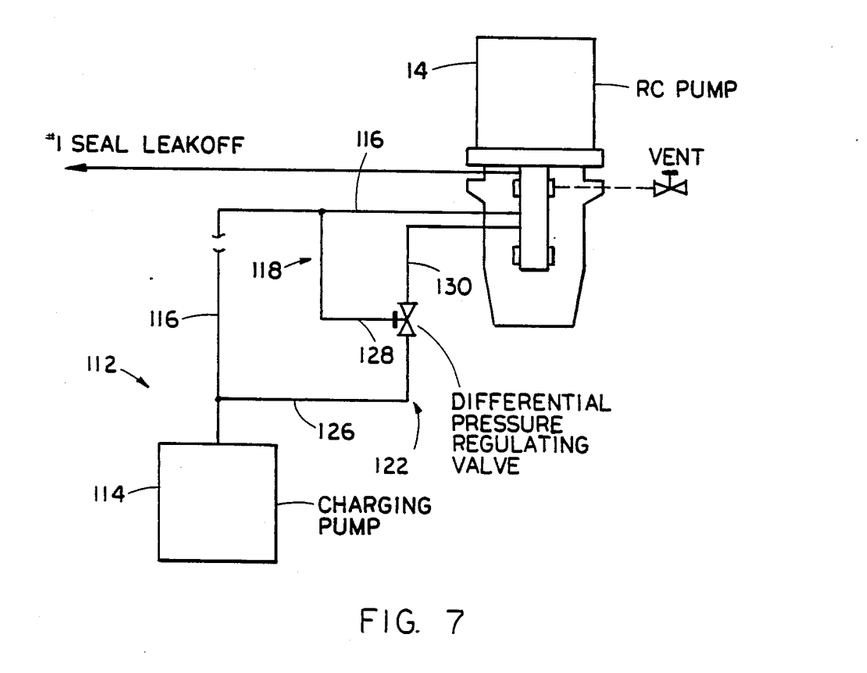
FIG. 7 is a schematic diagram of an external injection system for supplying pressurized fluid to the hydraulic balance chamber of the primary sealing assembly of FIG. 6.

Referring now to FIGS. 5-7 and especially FIG. 7, an external system fluid source 112 in the form of a conventional existing injection system is connected to the pump housing 30 to provide pressurized system fluid to the housing interior 36 at the supply pressure. The supply pressure is variable between a low pressure at pump startup and a high pressure at pump operation. The external system fluid source 112 includes a pressurized fluid pumping source in the form of a charging pump 114 and a main fluid flow line 116 connecting the charging pump 114 to the housing interior 36 via an injection supply port (not shown) being similar to port 73 on the prior art pump housing 30 of FIG. 2 to communicate pressurized system fluid thereto. It should be pointed out here that the referred to injection system is an existing part of the present pump seal injection system which in essence has been simply modified to take a feed off for the balance chamber pressure regulation.

Also, an external balance fluid source 118 is connected to the pump housing 30, or more specifically to the portion thereof called the seal housing 32, for providing pressurized balance fluid to the second chamber 108 and the second surface 88 on the seal ring 84 being contiguous therewith. Means for providing flow communication of pressurized balance fluid from the external balance fluid source 118 to the second chamber 108 and the second seal ring surface 88 is in the form of a flow passage 120 (FIGS. 5 and 6) defined within the housing 32 from the exterior thereof to the second chamber 108. The flow passage 120 is sealed by O-ring seals 121 in the housing 32.

Figure 13:
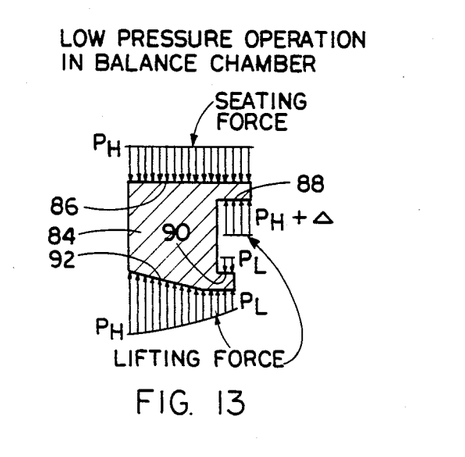
FIGS. 13 and 14 are schematic representations of the seal ring of the modified primary sealing assembly of FIG. 12, illustrating the areas thereon at which are applied opposing lifting and seating forces respectively when low and high pressure is communicated to the second balance chamber provided in the modified primary sealing assembly.

The external balance fluid source 118 can take any one of man different suitable forms which can provide a pressurized balance fluid to the second chamber 108 at a balance pressure being greater than the supply pressure of the pressurized system fluid (communicated to the first chamber 106) by a differential pressure having a constant relationship to the supply pressure. As depicted in FIG. 13, such balance pressure of the fluid in the second chamber 108 is effective at pump startup, when the supply pressure of the fluid in the housing 30 and first chamber 106 is low, to apply a lifting force on the seal ring second surface 88 which augments a lifting force imposed on the seal ring bottom facing surface 92 by the supply pressure in countering a stating force imposed on the ring first surface 86 by the supply pressure. The seating force is sufficiently overcome at the low system pressure so that at pump startup the hydrostatic lifting force between the facing surfaces 64,92 of the runner 44 and seal ring 84 is sufficient to support a film and produce a leakrate therebetween which is above the predetermined minimum necessary to keep the surface from contacting one another. However, such balance pressure of the fluid in the second chamber 108 is ineffective at full pump operation, when the supply pressure of the system fluid in the housing 30 and first chamber 106 is high, to counter the seating force imposed on the first surface 86 by the supply pressure in a manner which would adversely affect the balance between the facing surfaces. By proper selection of the location of first and second seal means (grooves 94,96 and O-rings 102,104) defining the second chamber 108, the size of the unseating or lifting force produced in the second chamber can be controlled.

Figure 14:
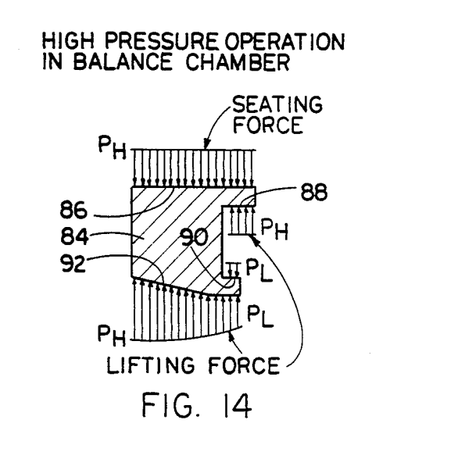

The key feature here is that the unseating force produced in the second chamber 108 is essentially greater than the system pressure in the housing 30 and first chamber 106 by a constant thereto over the range thereof. This is ensured in the specific embodiment of the external balance fluid source 118 employed herein by using the same ultimate source for the pressurized balance fluid as that which supplies the pressurized system fluid to the housing 30. The pressure differential between the balance pressure and the system pressure is essentially insensitive to large changes in system pressure. This is because the differential pressure regulator valve 124 maintains a constant differential between the balance pressure and system pressure irrespective of the system pressure. As represented in FIG. 14, as the system pressure increases to high pressure operation when the pump becomes fully operational, the differential force becomes negligible in comparison to the growing hydraulic lift and seating forces. At the higher pressures, the forces are essentially balanced such that a leakrate is produced between the facing surfaces 64,92 of the runner 44 and seal ring 84 which is above the predetermined minimum thereof.

Figure 15:
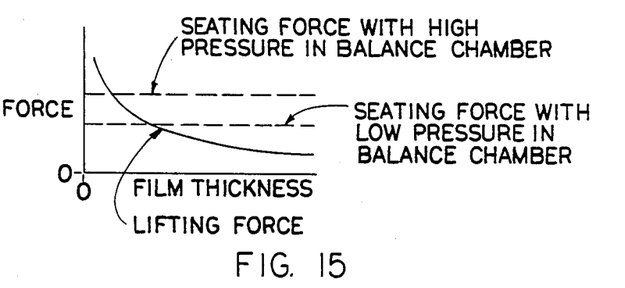
FIG. 15 is a graph demonstrating the relationships between film thickness, lifting force and seating force produced by the modified primary sealing assembly of FIG. 12.
Figure 16:
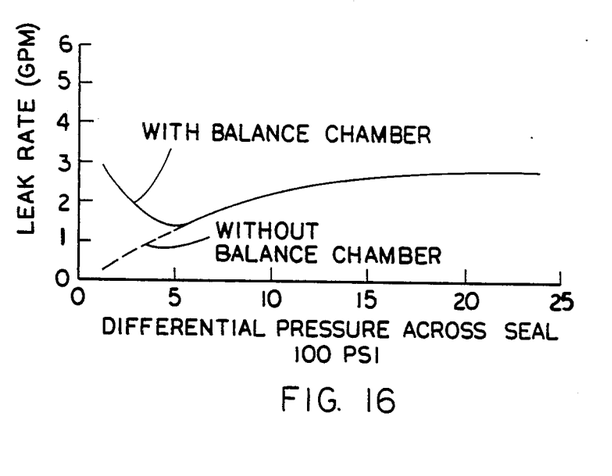
FIG. 16 is a graph demonstrating the effect on leakage rate across the entire pressure range of the modified primary sealing assembly of operation of the externally pressurized balance chamber of the modified primary sealing assembly in accordance with the principles of the present invention.
Figure 17:
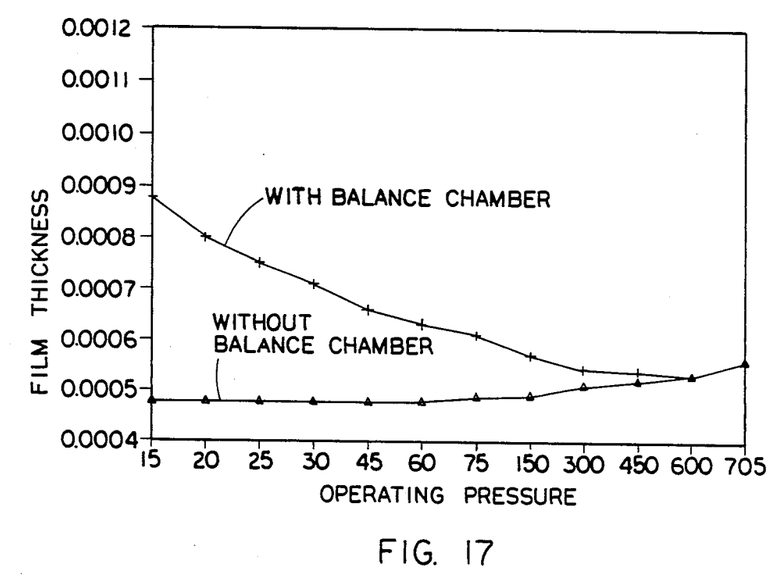
FIG. 17 is a graph demonstrating the effect on film thickness across the operating pressure range of the primary sealing assembly without and with the externally pressurized balance chamber.

The net result is an increased seating force and smaller film thickness at higher pressures and lower seating force and film-riding capacity at lower pressures, as illustrated in FIG. 15. Since small changes in the seating force can produce large changes in leakage (because, for a given pressure differential across the facing surfaces 64,92, the leakrate varies with the cube of the film thickness), the leakrate can actually be tuned at either low or high pressures by adjusting the pressure in the second or balance chamber 108. By carefully selecting the balance chamber diameters and facing surface taper angle, the leakrate at low system pressure can be established as nearly the same as the leakrate at the maximum system pressure condition where the leakage remains low because of the designed "rollover" of the taper facing surfaces. The resulting leakage profile when the second balance chamber 108 is present and its comparison to the prior design without such chamber is shown in FIG. 16. The corresponding film thickness profile for a representative reactor coolant pump primary sealing assembly with and without the second balance chamber 108 is shown in FIG. 17. Because the seating force is reduced by the second balance chamber pressurization, the hydraulic lift force between the facing surfaces 64,92 produces an increase in the film thickness and, therefore, leakage, as depicted in FIGS. 16 and 17. This increase is not only significant enough to raise the leakage sufficiently above the noise range of leakage detection but also can be tuned simultaneously to any desired level by adjusting the pressure to the second chamber 108.

In one example of the external balance fluid source 118 shown in FIG. 7, a bypass fluid flow means 122 is located downstream of the charging pump 114 and connects the main fluid flow line 116 to the balance fluid flow passage 120 in the housing 32 and a differential pressure regulating valve 124 is disposed in the bypass fluid flow means 122 for receiving pressurized system fluid and producing the pressurized balance fluid. The bypass fluid flow means 122 includes a pair of fluid flow lines 126,128 interconnecting the main fluid flow line 116 and the differential pressure regulating valve 124 at an input side thereof and a third fluid flow line 130 interconnecting the balance fluid flow passage 120 in the housing 32 and the differential pressure regulating valve 124 at an output side thereof.

The bypass arrangement with the differential pressure regulating valve 124 will maintain a constant pressure differential between the balance pressure in the second chamber 108 and the system pressure in the pump housing 30. The regulating pressure can be adjusted initially to provide sufficient hydraulic lift at the facing surfaces 64,92 to establish the necessary film-riding capacity to start up the pump. This pressure differential would be small (less than 5 psid), and by carefully selecting the size of the second chamber 108, the low pressure leakrate can be established to be the same as that at the maximum system pressure. The key feature is that this differential remains essentially constant as the reactor coolant pump system pressure increases. Its counterbalance force effect quickly disappears as the system pressure increases above the low pressure range and the seal leakrates revert to the conventional values obtained with the prior pump design.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. In combination, a pump having a shaft and a housing having an exterior and an interior for containing pressurized system fluid, an external system fluid source for providing pressurized system fluid to said housing interior at a supply pressure which is variable between a low pressure at pump startup and a high pressure at pump operation, and a hydrostatic sealing assembly for sealably and rotatably mounting said shaft within said housing interior, said sealing assembly comprising:
   (a) an annular runner circumscribing and mounted around said shaft for rotation therewith;
   (b) an annular seal ring circumscribing and mounted within said housing interior in non-rotational relationship thereto but for translatory movement along said shaft and said housing;
   (c) said runner and seal ring having surfaces facing one another and between which pressurized system fluid within said housing interior creates a flowing film of low pressure fluid which prevents said facing surfaces of said respective runner and seal ring from coming into contact with one another so long as a predetermined minimum leakrate is maintained therebetween;
   (d) means defining first and second surfaces on said seal ring facing in directions opposite to one another and in sealingly isoated relationship from one another, said first surface on said seal ring being in flow communication with pressurized system fluid at said supply pressure thereof within said housing interior and facing in a direction opposite to that faced by said facing surface on said seal ring, said second surface on said seal ring being in sealingly isolated relationship with respect to said facing surfaces on said runner and seal ring and facing in a direction the same at that faced by said facing surface on said seal ring;
   (e) an external balance fluid source for providing pressurized balance fluid to said second surface on said seal ring at a balance pressure which augments said supply pressure of the pressurized system fluid by a constant differential pressure that is effective at pump startup when said supply pressure is low, and ineffective at pump operation when said supply pressure is high, to counter a seating force imposed on said seal ring first surface by said supply pressure and augment a lifting force imposed on said seal ring facing surface by said supply pressure so that at both pump startup and operation leakrates are produced between said facing surfaces of said runner and seal ring which are above said predetermined minimum thereof; and (g) means for providing flow communication or pressurized balance fluid from said external balance fluid source to said second surface of said seal ring.

2. The sealing assembly as recited in claim 1, wherein said first surface of said seal ring defines a substantially larger area than said second surface thereof.

3. The sealing assembly as recited in claim 1, wherein said means defining said first and second surfaces on said seal ring includes first and second spaced apart annular seal means disposed along said seal ring between said seal ring and said shaft.

4. The sealing assembly as recited in claim 3, wherein said first and second spaced apart annular seal means define first and second chambers disposed contiguous with said first and second isolated surfaces on said seal ring.

5. The sealing assembly as recited in claim 4, wherein said balance fluid flow communication providing means is a flow passage defined within said housing from said exterior thereof to said second chamber disposed contiguous with said second surface of said seal ring 6. The sealing assembly as recited in claim 4, wherein said first annular seal means sealingly isolates said first chamber from said second chamber and in communication with the pressurized system fluid at said supply pressure.

7. The sealing assembly as recited in claim 4, wherein said second annular seal means sealingly isolates said second chamber from said facing surfaces of said runner and seal ring.

8. The sealing assembly as recited in claim 1, wherein said balance fluid flow communication providing means is a flow passage defined within said housing from said exterior thereof to adjacent said second surface of said seal ring.

9. The sealing assembly as recited in claim 1, wherein:
said external system fluid source includes a pressurized fluid pumping source and a main fluid flow line connecting said pumping source to said housing interior to communicate pressurized system fluid thereto; and
said external balance fluid source includes a bypass fluid flow means connecting said main fluid flow line to said balance fluid flow communication providing means and a differential pressure regulating valve disposed in said bypass fluid flow means for receiving pressurized system fluid and producing said pressurized balance fluid.

10. The sealing assembly as recited in claim 9, wherein said balance fluid flow communication providing means is a flow passage defined within said housing from said exterior thereof to adjacent said second surface of said seal ring.

11. The sealing assembly as recited in claim 9, wherein said bypass fluid flow means includes a pair of fluid flow lines interconnecting said main fluid flow line and said valve at an input side thereof and a third fluid flow line interconnecting said balance fluid flow communication providing means and said valve at an output side thereof.

12. The sealing assembly as recited in claim 11, wherein said balance fluid flow communication providing means is a flow passage defined within said housing from said exterior thereof to adjacent said second surface of said seal ring.

13. In combination, a pump having a shaft and a housing having an exterior and an interior for containing pressurized system fluid, an external system fluid source for providing pressurized system fluid to said housing interior at a supply pressure which is variable between a low pressure at pump startup and a high pressure at pump operation, and a hydrostatic sealing assembly for sealably and rotatably mounting said shaft within said housing interior, said sealing assembly comprising:

(a) an annular runner circumscribing and mounted around said shaft for rotation therewith;

(b) an annular seal ring circumscribing and mounted within said housing interior in non-rotational relationship thereto but for translatory movement along said shaft and said housing;

(c) said runner and seal ring having annular surfaces on adjacent ends thereof facing one another and between which pressurized system fluid within said housing interior creates a flowing film or low pressure fluid which prevents said facing surfaces of said respective runner and seal ring from coming into contact with one another so long as a predetermined minimum leakrate is maintained therebetween;

(d) said seal ring having first, second and third anular peripheral surfaces thereon, said first and third peripheral surfaces facing in a direction opposite to that faced by said second peripheral surface, said second peripheral surface facing in a direction the same as that faced by said end surface of said seal ring;

(e) first annular seal means disposed between said seal ring and said shaft and along said seal ring between said first and second peripheral surfaces thereon so as to define a first chamber contigous with said first peripheral surface of said seal ring which communicates with pressurized system fluid at said supply pressure thereof within said housing interior;

(f) second annular seal means disposed between said seal ring and said shaft and along said seal ring between said second and third peripheral surfaces thereon so as to define a second chamber contiguous with said second peripheral surface of said seal ring and a third chamber contiguous with said third peripheral surface of said seal ring, said third chamber communicating with said fluid film which flows between said end surfaces of said runner and seal ring at said lower pressure thereof;

(g) said first, second and third chambers being defined by said first and second annular seal means is substantially non-communicative isolated relationship to one another;

(h) an external balance fluid source for providing to said second chamber and said second surface on said seal ring being contigous therewith a pressurized balance fluid at a balance pressure which augments said supply pressure, of the pressurized system fluid provided to said first chamber and said first surface on said seal ring being contiguous therewith, by a constant differential pressure that is effective at pump startup when said supply pressure is low, and ineffective at pump operation when said supply pressure is high, to counter a seating force imposed on said seal ring first surface by said supply pressure and augment a lifting force imposed on said seal ring end surface by said supply pressure so that at both pump startup and operation leakrates are produced between said end surfaces of said runner and seal ring which are above said predetermined minimum thereof; and (i) means for providing flow communication of pressurized balance fluid from said external balance fluid source to said second chamber and said second surface of said seal ring.

14. The sealing assembly as recited in claim 13, wherein said first annular peripheral surface defines a substantially larger area than either said second or third surfaces.

15. The sealing assembly as recited in claim 13, wherein said balance fluid flow communication providing means is a flow passage defined within said housing from said exterior thereof to said second chamber and said second surface of said seal ring.

16. The sealing assembly as recited in claim 13, wherein:
   said external system fluid source includes a pressurized fluid pumping source and a main fluid flow line connecting said pumping source to said housing interior to communicate pressurized system fluid thereto; and
   said external balance fluid source includes a bypass fluid flow means connecting said main fluid flow line to said balance fluid flow communication providing means and a differential pressure regulating valve disposed in said bypass fluid flow means for receiving pressurized system fluid and producing said pressurized balance fluid.

17. The sealing assembly as recited in claim 16, wherein said balance fluid flow communication providing means is a flow passage defined within said housing from said exterior thereof to said second chamber and said second surface of said seal ring.

18. The sealing assembly as recited in claim 16, wherein said bypass fluid flow means includes a pair of fluid flow lines interconnecting said main fluid flow line and said valve at an input side thereof and a third fluid flow line interconnecting said balance fluid flow communication providing means and said valve at an output side thereof.

19. A sealing assembly for use in a pump, said sealing assembly comprising:
   (a) an annular runner mountable in circumscribing relation around a rotatable shaft of the pump for rotation therewith;
   (b) an annular seal ring mountable in circumscribing relation within the interior of a housing of the pump in non-rotational relationship thereto but for translatory movement along the shaft and housing of the pump;
   (c) said runner and seal ring having surfaces facing one another and between which pressurized system fluid within the housing interior creates a flowing film of low pressure fluid which prevents said facing surfaces of said respective runner and seal ring from coming into contact with one another so long as a predetermined minimum leakrate is maintained therebetween;
   (d) means defining first and second surfaces on said seal ring facing in directions opposite to one another and in sealingly isolated relationship from one another, said first surface on said seal ring being in flow communication with pressurized system fluid at a supply pressure thereof within the housing interior and facing in a direction opposite to that faced by said facing surface on said seal ring, said second surface on said seal ring being in sealingly isolated relationship with respect to said facing surfaces on said runner and seal ring and facing in a direction the same as that faced by said facing surface on said seal ring;
   (e) an external balance fluid source for providing pressurized balance fluid to said second surface on said seal ring at a balance pressure said supply pressure of the pressurized system fluid by a constant differential pressure that is effective at startup of the pump when the supply pressure is low, and ineffective at operation of the pump when the supply pressure is high, to counter a seating force imposed on said seal ring first surface by the supply pressure and augment a lifting force imposed on said seal ring facing surface by the supply pressure so that at both pump startup and operation leakrates are produced between said facing surfaces of said runner and seal ring which are above said predetermined minimum thereof; and
   (g) means for providing flow communication of pressurized balance fluid from said external balance fluid source to said second surface of said seal ring.

20. The sealing assembly as recited in claim 19, wherein said first surface of said seal ring defines a substantially larger area than said second surface thereof.

21. The sealing assembly as recited in claim 19, wherein said means defining said first and second surfaces on said seal ring includes first and second spaced apart annular seal means disposed along said seal ring between said seal ring and said shaft.

22. The sealing assembly as recited in claim 21, wherein said first and second spaced apart annular seal means define first and second chambers disposed contiguous with said first and second isolated surfaces on said seal ring.

23. The sealing assembly as recited in claim 22, wherein said first annular seal means sealingly isolates said first chamber from said second chamber and in communication with the pressurized system fluid at said supply pressure.

24. The sealing assembly as recited in claim 22, wherein said second annular seal means sealingly isolates said second chamber from said facing surfaces of said runner and seal ring.

25. A pump comprising a rotatable shaft, a stationary housing having an interior for containing pressurized system fluid, and a sealing assembly, said sealing assembly comprising:
   (a) an annular runner circumscribing and mounted around said rotatable shaft for rotation therewith;
   (b) an annular seal ring circumscribing and mounted within said housing interior in non-rotational relationship thereto but for translatory movement along said shaft and said housing;
   (c) said runner and seal ring having annular surfaces facing one another and between which pressurized system fluid within which said housing interior creates a flowing film of low pressure fluid which prevents said facing surfaces of said respective runner and seal ring from coming into contact with one another so long as a predetermined minimum leakrate is maintained therebetween;
   (d) means defining first and second surfaces on said seal ring facing in directions opposite to one another and in sealingly isolated relationship from one another, said first surface on said seal ring being in flow communication with pressurized system fluid at said supply pressure thereof within said housing interior and facing in a direction opposite to that faced by said facing surface on said seal ring, said second surface on said seal ring being in sealingly isolated relationship with respect to said facing surfaces on said runner and seal ring and facing in a direction the same as that faced by said facing surface on said seal ring;

(e) an external balance fluid source for providing pressurized balance fluid to said second surface on said seal ring at a balance pressure which augments the supply pressure of the pressurized system fluid by a constant differential pressure that is effective at pump startup when said supply pressure is low, and ineffective at pump operation when said supply pressure is high, to counter a seating force imposed on said seal ring first surface by said supply pressure and augment a lifting force imposed on said seal ring facing surface by said supply pressure so that at both pump startup and operation leakrates are produced between said facing surfaces of said runner and seal ring which are above said predetermined minimum thereof; and (g) means for providing flow communication of pressurized balance fluid from said external balance fluid source to said second surface of said seal ring.

26. The sealing assembly as recited in claim 25, wherein said first surface of said seal ring defines a substantially larger area than said second surface thereof.

27. The sealing assembly as recited in claim 25, wherein said means defining said first and second surfaces on said seal ring includes first and second spaced apart annular seal means disposed along said seal ring between said seal ring and said shaft.

28. The sealing assembly as recited in claim 27, wherein said first and second spaced apart annular seal means define first and second chambers disposed contigous with said first and second isolated surfaces on said seal ring.

29. The sealing assembly as recited in claim 28, wherein said first annular seal means sealingly isolates said first chamber from said second chamber and in communication with the pressurized system fluid at said supply pressure.

30. The sealing assembly as recited in claim 28, wherein said second annular seal means sealingly isolates and seal ring.

* * * * *